United States Patent [19]

Natale et al.

[11] Patent Number: 4,944,198

[45] Date of Patent: Jul. 31, 1990

[54] TOOL-HOLDER TURRET WITH AN EPICYCLIC TRANSMISSION AND POSITIONING UNIT

[75] Inventors: Mario Natale, Cologno Monzese; Pier C. Boffelli, Milan, both of Italy

[73] Assignee: Baruffaldi S.p.A., San Donato Milanese, Italy

[21] Appl. No.: 214,664

[22] Filed: Jul. 1, 1988

[30] Foreign Application Priority Data

Jul. 14, 1987 [IT] Italy ............................... 21270 A/87
Jun. 8, 1988 [IT] Italy ............................... 48062 A/88

[51] Int. Cl.$^5$ ............................................. B23Q 16/00
[52] U.S. Cl. ................................. 74/813 R; 74/813 L; 74/816; 74/820; 29/39; 29/48.5 R; 29/48.5 A
[58] Field of Search ..................... 74/820, 826, 813 L, 74/813 C, 813 R, 816; 408/35; 29/39, 48.5 R, 48.5 A, 35.5

[56] References Cited

U.S. PATENT DOCUMENTS

| | | | |
|---|---|---|---|
| 3,207,007 | 9/1965 | Jennings | 74/820 |
| 3,332,303 | 7/1967 | Daugherty | 74/820 X |
| 3,606,804 | 9/1971 | Gotz et al. | 74/820 |
| 3,665,789 | 5/1972 | Fisher | 74/813 L |
| 3,718,055 | 2/1973 | Maier | 74/826 |
| 4,302,870 | 12/1981 | Schalles et al. | 74/820 X |

*Primary Examiner*—Rodney M. Lindsey
*Attorney, Agent, or Firm*—Herbert Dubno

[57] ABSTRACT

The tool-holder turret for lathes or like machining centers has a fixed support member (1; 52) bearing a rotary member (4; 51) to which there may be attached a tool-holder plate designed to bear a plurality of tools, each of which can brought into the operating position by the rotation of the rotary member, a drive motor (12; 54) also being provided, which is connected to a geared differential transmission unit (15, 18, 20; 47, 18, 20; 57, 64, 66) having three members, the first member, called the driver (15; 47; 57), being connected to the motor and controlling, on one hand, the opening and closing of the turret and, on the other hand, the rotation of its rotary member, the second member, which can be driven in rotation, of the differential unit (18; 18; 64) being connected to the rotary member and the third member, which can be driven in rotation, of the differential unit (20; 20; 66) being connected, via interposed cam transmission means (21, 23; 71, 72), to a rotationally fixed and axially movable member for relative engagement between the fixed member and the rotary member (7; 73), rotational locking members (29; 80; 34, 35; 40, 41; 76, 77) being provided for one of the members which can be driven of the differential unit for the transmission of movement to the other member and to the components associated therewith for the sequential control of the disengagement of the fixed member and the rotary member, the rotation of the rotary member into the preselected position and the reengagement of the fixed member and the rotary member, structure (97, 116) associated with the axially movable and rotationally fixed member also being provided and actuating the coupling of means for the transmission of movement to a rotary tool in the operating position.

15 Claims, 12 Drawing Sheets

TOOL-HOLDER TURRET WITH AN EPICYCLIC TRANSMISSION AND POSITIONING UNIT

FIELD OF THE INVENTION

This invention relates to a tool holder turret for electromechanically operated high-speed lathes for the location in the operating position of one of a plurality of tools supported on a tool holder plate thereof.

BACKGROUND OF THE INVENTION

Marching operations for a large number of workpieces require the sequential use of several tools on the same workpiece in accordance with a previously decided and automatically controlled cycle.

The workpiece is normally mounted for this purpose on the lathe which comprises a turret bearing a plurality of tools which can be disposed when necessary in the operating position to perform the machining of the workpiece required from them under the control of an electronic unit.

A fundamental requirement of such machining is speed, in particular by reducing the idle time between the end of machining by one tool and the beginning of machining by the next tool needed to allow the turret to perform all the movements required to bring the new tool into the operating position.

For this purpose the turret must unlock from the fixed operating position, rotate in one or other direction along the shortest path until the new tool is located in the operating position, stop and return to the locked position.

These operations are carried out, in known turrets, by mechanical devices which transmit the rotation from a drive motor to the too-holder plate and simultaneously control the actuation of the locking and unlocking means, using particularly complex and costly structures.

The German Patent DE 31 34 969 in the name of SAUTER FEINMECHANIK GmbH discloses a turret in which a motor causes, via a reduction gear of the epicyclic type, the rotation of a ring bearing rollers which cause, via cam openings of a locking ring, the axial movement of the locking ring itself, which rotates together with the tool holder plate, causing the unlocking of the tool holder plate; the subsequent rotation of the ring bearing the roller drives, via correspondingly shaped recesses within which the rollers are engaged, the tool holder plate; when the desired position is reached and the rotation of the tool holder plate is arrested, the subsequent reverse rotation of the motor causes, via the cam openings, the locking ring to return to the locked position.

The Italian Patent No. 1138598 in the name of DUPLOMATIC APPLICATION OLEODINAMICHE has a motor which drives, via a worm screw and helical gear reduction unit, an assembly provided with rollers engaged with the cam profile of a slide coaxial therewith, rigid with a locking ring of the tool holder member and connected thereto in rotation; the rotation of the assembly firstly causes the axial movement of the slider, thus unlocking the tool holder and then, after unlocking, the drive of the slider and the tool holder into the desired position where, after the tool holder is arrested, a rotation of the assembly in the opposite direction brings the slider back into the locking position.

In both these embodiments the locking member of the tool holder is caused to rotate together with this holder as well as performing an axial movement for the locking and unlocking of the tool holder.

OBJECT OF THE INVENTION

It is the object of the invention to provide a turret which has a particularly simple and reliable structure in which the number of relative mechanical components is reduced.

SUMMARY OF THE INVENTION

This object is achieved by the invention which provides a tool holder turret for lathes or like machining centers having a fixed support member bearing a rotary member to which there may be attached a tool holder plate designed to bear plurality of tools each of which can be brought into the operating position by the rotation of the rotary member. A drive motor is connected to a geared differential transmission unit having three members, the first member, called the driver, being connected to the motor and controlling, on one hand, the opening and closing of the turret and, on the other hand, the rotation of its rotary member. The second member, which can be driven in rotation, of the differential unit is connected to the rotary member and the third member, which can be driven in rotation, of the differential unit is connected, via interposed cam transmission means, to a rotationally fixed and axially movable member for relative engagement between the fixed member and the rotary member. Rotational locking means are provided for one of the members which can be driven of the differential unit for the transmission of movement to the other member and to the components associated therewith for the sequential control of the disengagement of the fixed member and the rotary member, the rotation of the rotary member into the preselected position and the reengagement of the fixed member and the rotary member. Means associated with the axially movable and rotationally fixed member are also provided and actuate the coupling of means for the transmission of movement to a rotary tool in the operating position.

BRIEF DESCRIPTION OF THE DRAWING

The above and other objects, features aand advantages of my invention will become more readily apparent from the following description, reference being made to the accompanying highly diagrammatic drawing in which.

SPECIFIC DESCRIPTION

Figure 1:
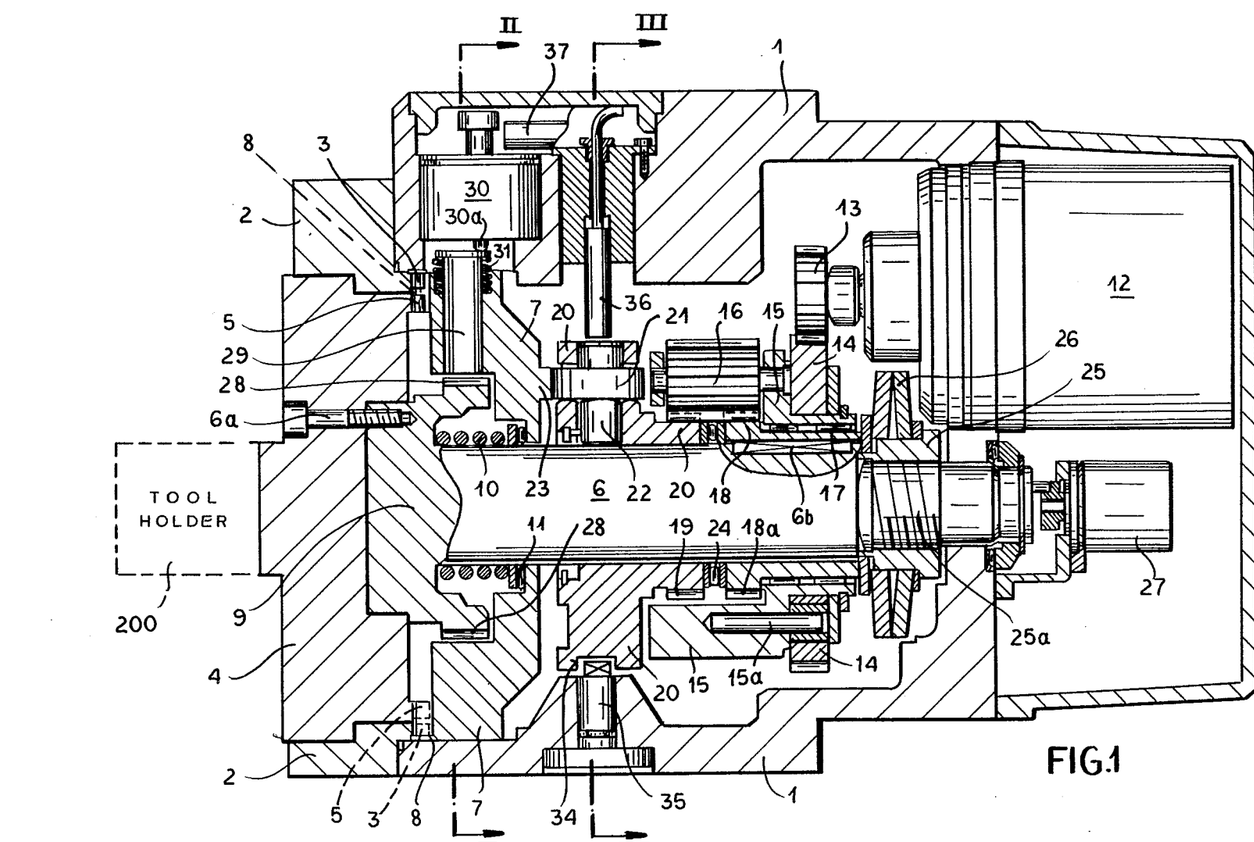
FIG. 1 is a view in axial section of a tool holder turret of the invention, of the type with a horizontal axis, along the line I—I of FIG. 3.
Figure 2:
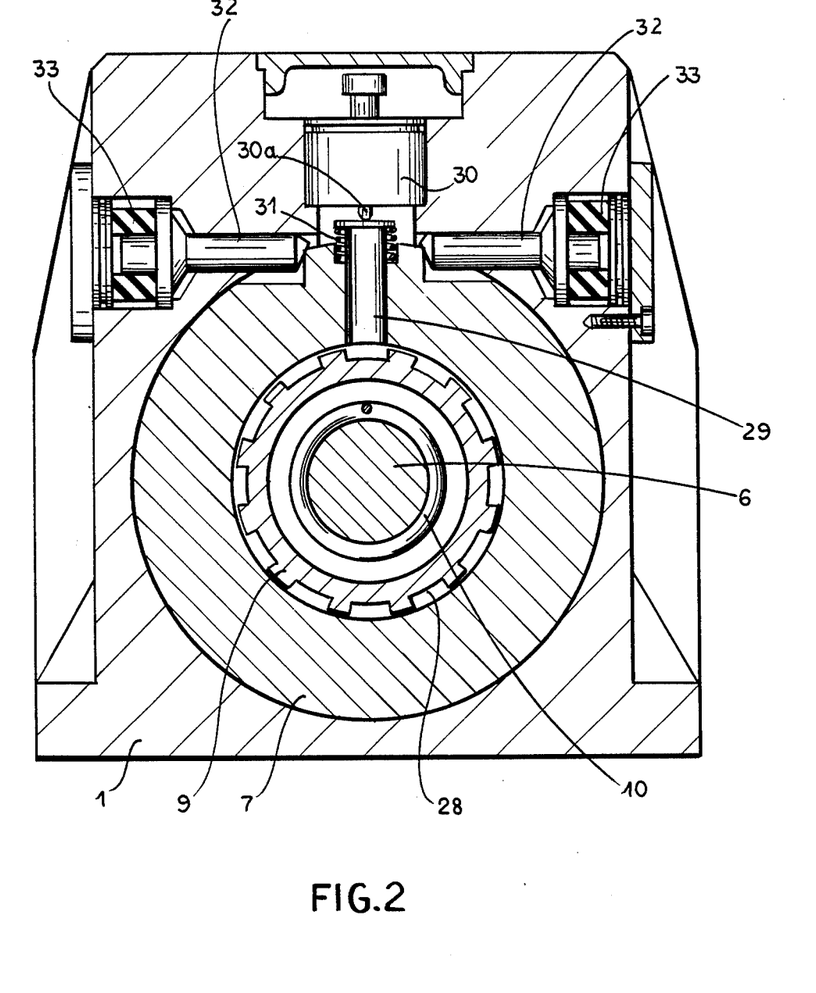
FIG. 2 is a section along the line II—II of FIG. 1.
Figure 3:
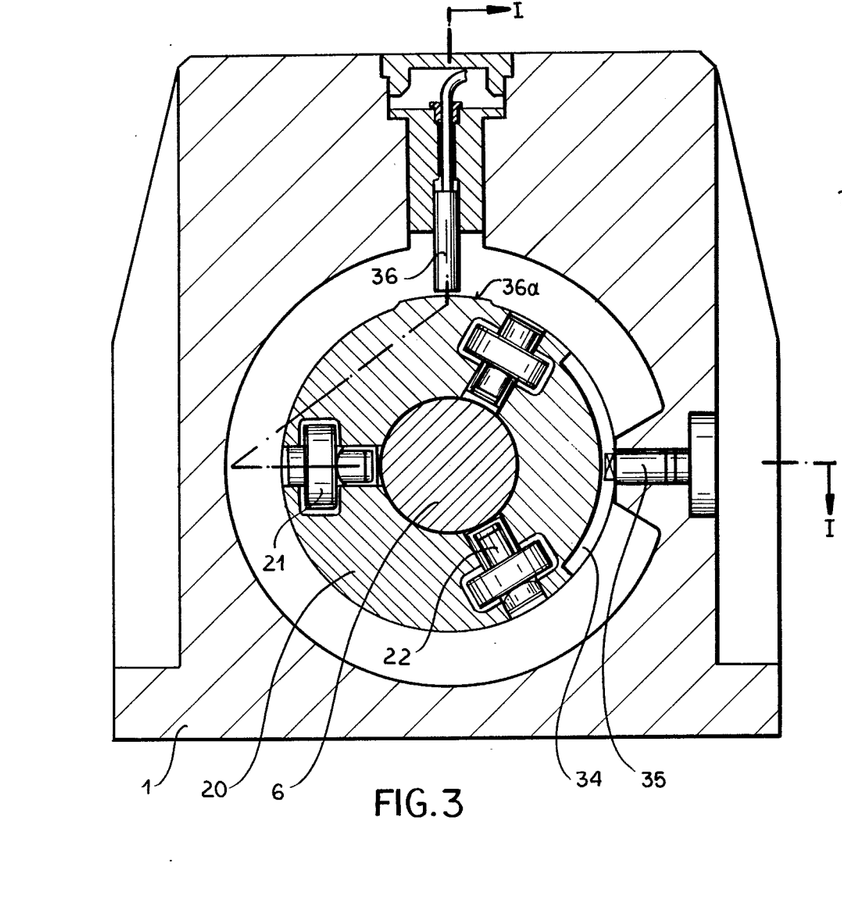
FIG. 3 is a section along the line III—III of FIG. 1.

As can be seen from FIGS. 1, 2 and 3, the turret of the invention is formed by an external support body 1, comprising a fixed ring 2, provided with fixed front toothing 3.

A disc 4, to which the tool holder plate of the turret (not shown) can be connected, rotates within the body 1; the disc 4 has front toothing 5 concentric and adjacent to the toothing 3. The front end of a shaft 6 rotating within the body 1 is connected to the disc 4 by screws 6a or the like.

A locking ring 7 with front toothing 8 facing the toothing 3, 5 and designed to engage therewith and connect them together is provided about the shaft 6; a spring 10, with a relative thrust bearing 11, designed to keep the toothing 8 out of engagement with the toothing 3, 5, is provided between the front widened end 9 of the shaft 6 and the ring 7.

A drive motor 12 is housed in the external body 1, which motor bears a pinion 13 engaged with a crown gear 14 which is rigid, via pin 15a or the like, with a planetary gear holder 15 bearing a plurality of planetary gears 16 disposed along a periphery, only one of which is shown in FIG. 1.

The planetary gear holder 15 is mounted to rotate, with bearings 17, about the cylindrical portion of a gear 18 which is rotational rigid, by means of the key 6b, with the shaft 6 and engaged with its toothing 18a via the planetary gears 16.

The planetary gears 16 are also engaged with the toothing 19 of an annular body 20 coaxial with the shaft 6 and rotatable with respect thereto.

The planetary gears 16, borne by the planetary gear holder 15 form, together with the toothing 18a of the gear 18 and the toothing 19 of the annular body 20, a differential unit of epicyclic type, in which the rotary movement imparted to the planetary gear holder 15 may be transmitted to one or other of the toothing 18a, 19 when one of them is kept rotationally fixed.

The annular body 20 is provided with a plurality of rollers 21 supported on respective spindles 22, with radial axes with respect to the shaft 6, which bear against the front cam profile 23 of the locking ring 7.

Figure 4:
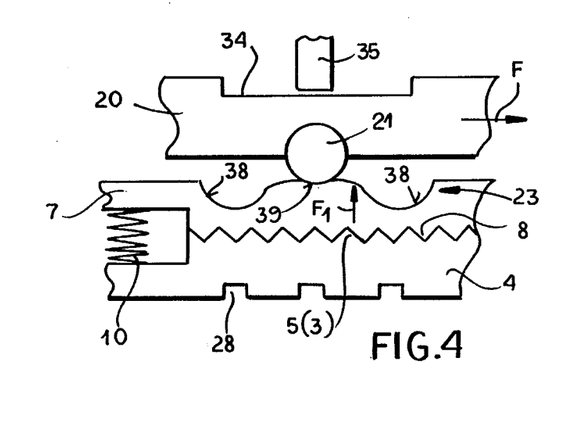
FIG. 4 is an operating diagram of the turret locking members, in the locked position.
Figure 5:
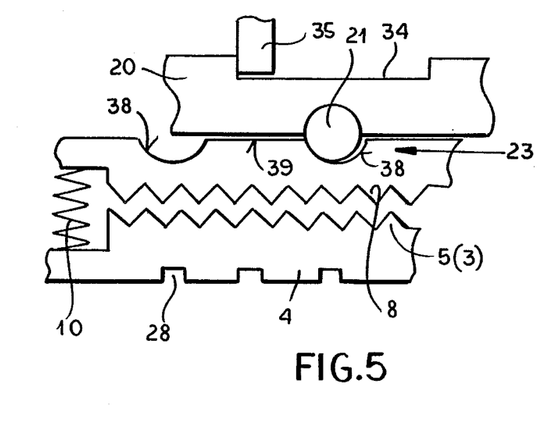
FIG. 5 shows the diagram of FIG. 4 in the unlocked position.

The shape, in the peripheral direction, of the front cam profile 23 is shown, at the location of one of the rollers 21, in FIGS. 4 and 5, in which it has a plane development.

The locking ring 7 has its front cam profile 23 pressed against the rollers 21 by the thrust exerted by the spring 10.

The annular body 20 bears in the axial direction on the gear 18, with the interposition of a thrust bearing 24 and the gear 18 bears, in turn, against the stop ring 25 rigid with the shaft 6 via a thread 25a with the interposition of a pack of cup springs 26.

An angular position detector 27, known commercially as an "encoder", of known type is connected to the end of the shaft 6 and rotates therewith.

As shown in detail in FIG. 2, the front widened end 9 of the shaft 6 has on its outer surface a plurality of radial notches 28 whose number and position correspond to the number of stop positions of the turret, i.e. to the nuber of tools borne by the tool holder plate rigid with the disc 4; at the location of these notches the ring 7 is provided with a radial bolt 29 which may be inserted in these notches, against whose outward facing end there acts the movable member of an electromagnetic actuator 30 in opposition to a spring 31, which actuator, if actuated, causes the bolt to be inserted in one of the notches 28 facing it.

The ring 7 is also provided, as shown in FIG. 2, with damping units 32 provided with resilient cushioning buffers 33.

As is shown in FIG. 3, the annular body 20 for axial displacement comprises a plurality of equally spaced front rollers 21 (three in the Figure); its outer furface is also provided with a peripheraal notch 34 of limited angular extension within which a fixed stop pin 35 is inserted.

A magnetic proximity sensor 36, or like detection component, faces the surface of the body 20 and is designed to detect the fact that a projection 36a, disposed at the desired stop position of the body 20, is facing it, as described below.

A further proximity sensor 37, shown in part in FIG. 1, is disposed close to the electromagnetic actuator 30 and detects the position of its relative movable portion.

The front cam profile of the ring 7 can be seen in FIGS. 4 and 5: a pair of grooves 38, separated by a plane intermediate portion 39, is provided at the position of each roller 21 with the turret in the rest position, with the toothings 3, 5 and 8 engaged and the pin 35 in a median position in the notch 34.

In the rest condition, or during machining by a tool, the turret is located in the position shown diagrammatically in FIG. 4. The toothings 3,5 and 8 are engaged together, the rollers 21 are in a intermediate position between the grooves 38 and the pin 35 is in a median position in the notch 34.

In order to change the tool in use by means fo the turret of the invention, the motor 12 is caused to rotate. The motor, together with the gear 13, causes the rotation of the crown gear 14 and the planetary gear holder 15; since, in initial conditions, the gear 18 which is rotationally rigid with the shaft 6 and the disc 4 is kept stationary by the engagement of the front toothing 3, 8 and 5, the rotation of the planetary gear holder 15 causes, via the planetary gears 16, the annular body 20 to rotate and the rollers 21 roll above the cam profile 23.

This rotation of the annular body 20, for example in the direction of the arrow F of FIG. 4, brings the rollers 21 opposite one of the grooves 38 and they are inserted therein following the axial forward feed, in the direction of the arrow F1, of the ring 7 on which these grooves are provided, under the action of the spring 10.

When the roller 21 has penetrated into one of the corresponding grooves 38 the pin 35 is located at the end of the notch 34 and stops the rotation of the body 20 (FIG. 5).

The forward feed of the ring 7 has an amplitude such as to cause the disengagement of its toothing 8 from the toothing 3 and 5 thereby enabling the rotation of the disc 4, the shaft 6 rigid therewith and the gear 18. At this point, therefore, since the body 20 is locked, the motor 12, via the planetary gears 16, causes the rotation of the disc 4 to which the tool holder plate is connected, thereby loccating the preselected tool in the operating position.

When the position is reached, as detected by the "encoder" 27, the actuator 30 controls the forward feed of the locking bolt 29 which penetrates into one of the recesses 28 of the widened portion 9 and stops the rotation of the disc 4 which is rigid with the portion 9; the sensor 37, in turn, detects the completed forward feed of the bolt 29 and causes the motor 12 to stop.

The motor 12 then reverses its rotation, bringing the rollers 21 back into an intermediate position on the surface 39 between the two grooves 38 associated with each of these rollers, thereby pressing the ring 7 with the toothing 8 against the toothing 3, 5 in opposition to the spring 10, which toothing engages therewith and connects them together.

The compression of the pack of cup springs 26 ensures that the toothing 8 is locked against the toothings 3, 5 without the possibility of play.

When the rollers 21 are above the surfaces 39 of the profile 23, the proximity sensor 36, detecting the presence of the projection 36a, corresponding angularly to the surfaces 39, causes the motor 12 to stop.

The structure of the turret of the invention consequently makes it possible to provide the necessary movements of unlocking, rotation and locking of the turret in a particularly simple and reliable way, with the desired speed and with a smaller number of component parts.

As an alternative to the rollers 21 and the cam profile 23 with grooves 38, it is also possible to use corresponding friction profiles which cause, by means of their relative sliding, an axial displacement of the ring 7 which is of sufficient amplitude to disengage the toothing 8 from the toothings 3, 5. In order to dampen the impact caused by the insertion of the bolt 29 into the notch 28 associated with the preselected tool, damping units 32 are provided which allow the impact to be attenuated in both directions by means of a deformation of one of the relative resilient members 33.

Since these damping units are disposed at the point of the maximum diameter of the ring 7 it is possible to achieve efficient damping with a deformation of the relative resilient member 33 which is broad enough to transmitt limited stop forces to the structure in the presence of an angular stroke of the rotating parts of amplitude lower than the distance between two consecutive teeth of the toothings 3, 5 and 8.

Figure 6:
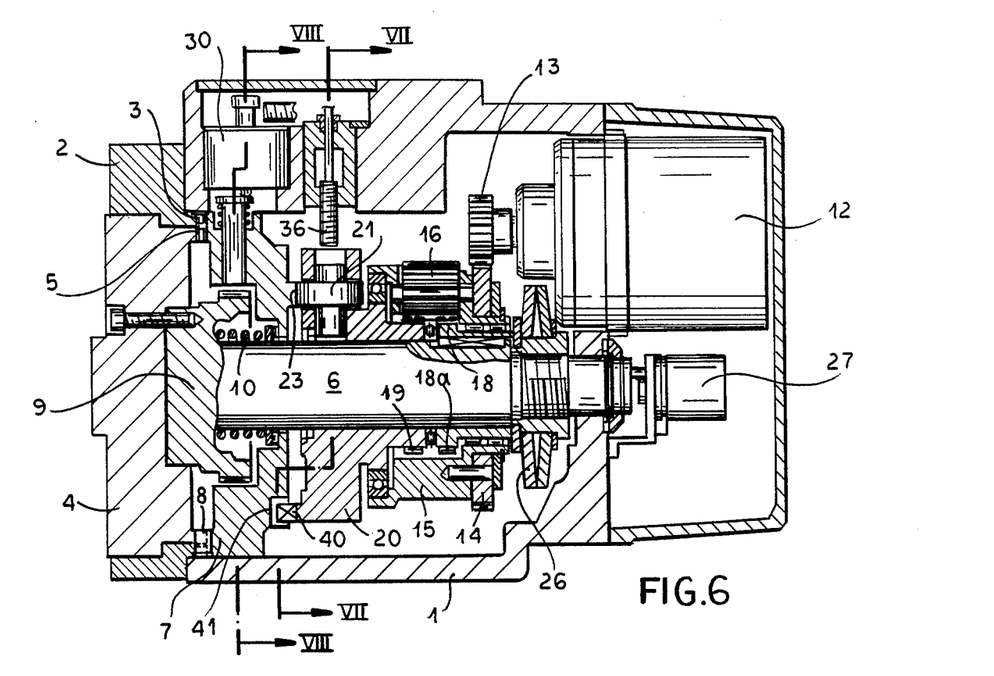
FIG. 6, shows in section an alternative embodiment of the turret of FIG. 1.
Figure 7:
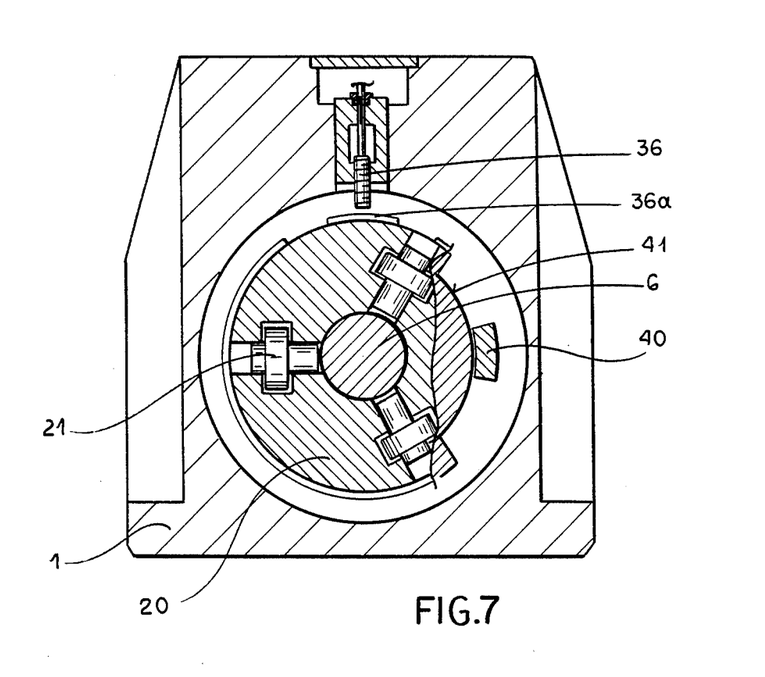
FIG. 7 is a section along the line VII—VII of FIG. 6.

FIG. 6 shows an alternative embodiment of the turret of the invention in which the fixed stop pin 35 rigid with the external body 1 and engaged in a recess 34 of the annular body 20 is replaced by a tooth 40, projecting axially from the annular body 20 and engaged in a corresponding recess 41 fo the locking ring 7, as shown in FIG. 7 as well.

Figure 9:
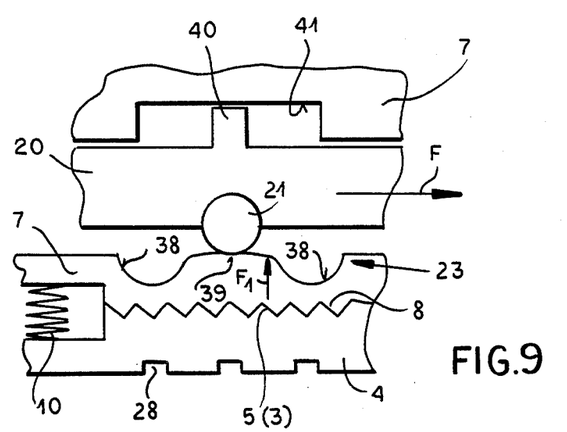
FIG. 9 is an operating diagram of the turret locking members of FIG. 6, in the locked position.
Figure 10:
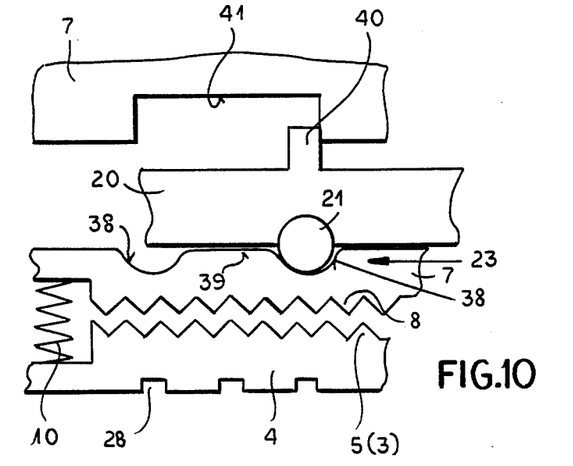
FIG. 10 shows the diagram of FIG. 9 in the unlocked positon.

The operation of the turret, in this embodiment, is equivalent to that described above and is known diagrammatically in FIGS. 9 and 10: the contact of the front toothing 40 with the end edge of the recess 41 stops the rotation of the body 20 at the location of the inlet of the rollers 21 into the grooves 38.

Figure 8:
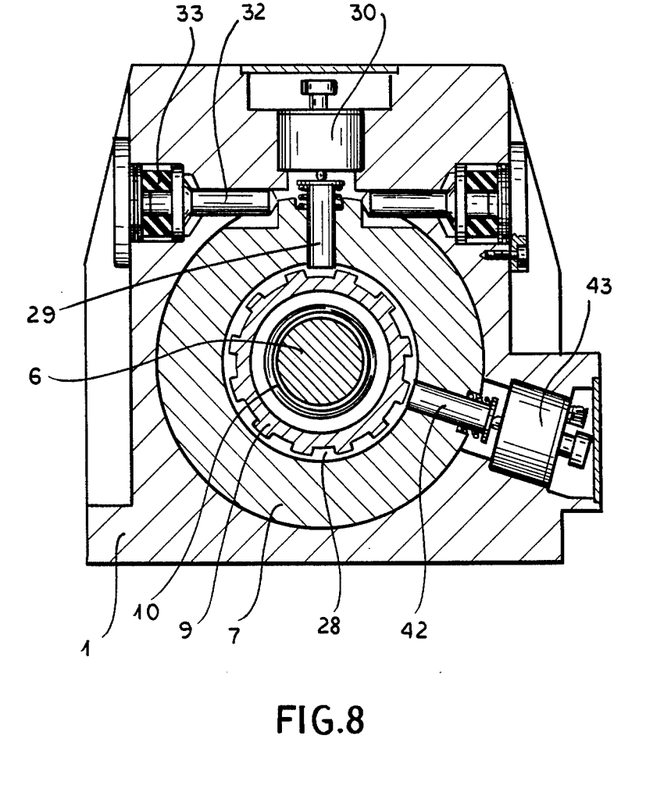
FIG. 8 is a section along the line VIII—VIII of FIG. 6.

The locking ring 7 is rotationally fixed, since it is required to perform only an axial movement, and may therefore carry out the function of stopping the rotation of the body 20; the use of the ring 7 for this purpose is also very advantageous since, as shown in FIG. 8, and in FIG. 2 as well, it is locked against rotation by dampers 32, 33 which thus make it possible to attenuate the impact of the stoppage of the body 20, thereby reducing stresses and vibrations in the unit as a whole.

In order to allow stoppage in a large number of positions, which thus makes it possible to dispose a large number tools on the turret, as shown in FIG. 8, there is provided, in addition to the bolt 29 with the relative actuator 30, a second bolt 42 provided with a relative electgromagnetic actuator 43 which is angularly offset with respect to the first by an angle corresponding to a whole number of notches of the end 9 plus half a notch.

In this way, when a bolt, for instance 29 in the position of FIG. 8, is opposite a notch 28, the other bolt, 42 in the Figure, is in an intermediate position between two notches and may be inserted in one of these by rotation through an angle equal to half that corresponding to two consecutive notches: this makes it possible, by actuating one or other of the bolts dependings on the desired position, to have a number of stop position which is double the number of notches 28 provided, while keeping the dimensions of the notches and the bolts large.

Figure 11:
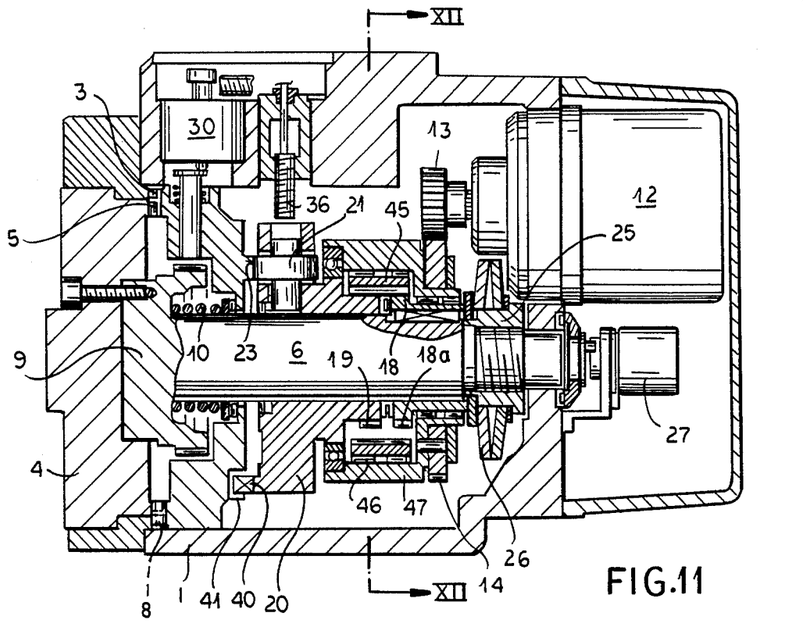
FIG. 11 shows a further alternative embodiment of the turret of FIG. 1.
Figure 12:
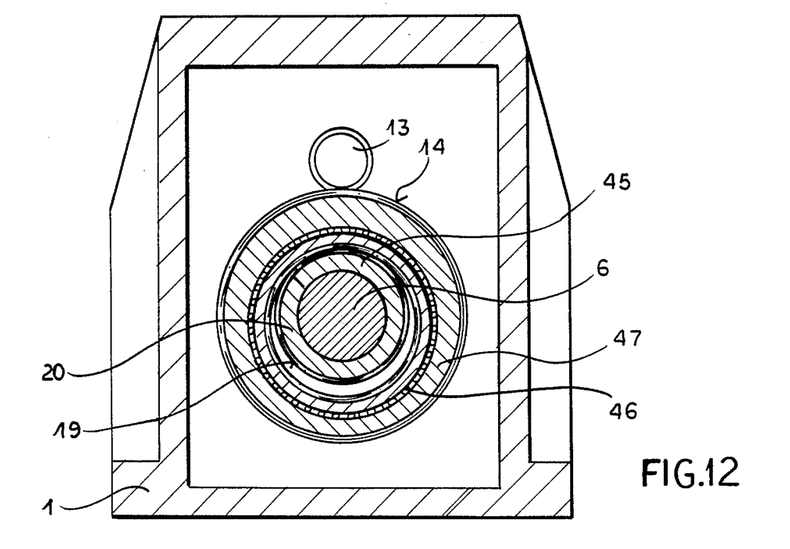
FIG. 12 is a section along the line XII—XII of FIG. 11.

FIGS. 11 and 12 shown an alternative embodiment of the turret, designed to allow a particularly compact structure; if comprises an internally toothed planetary gear 45 engaged with the toothings 19 and 18a and mounted to rotate, with an axis which is eccentric with respect to the axis of the turret, by means of the crown of rollers 46 within the planetary gear holder 47 rigid with the crown 14.

This system forms a differential epicyclic unit equivalent to that described above; the transmission of the movement is ensured by the difference between the number of teeth of the toothing 19 and that of the toothing 18a, as in the previous case. An appropriate correction of the profiles makes it possible to achieve the same pitch line between these and the planetary gear(s).

Figure 13:
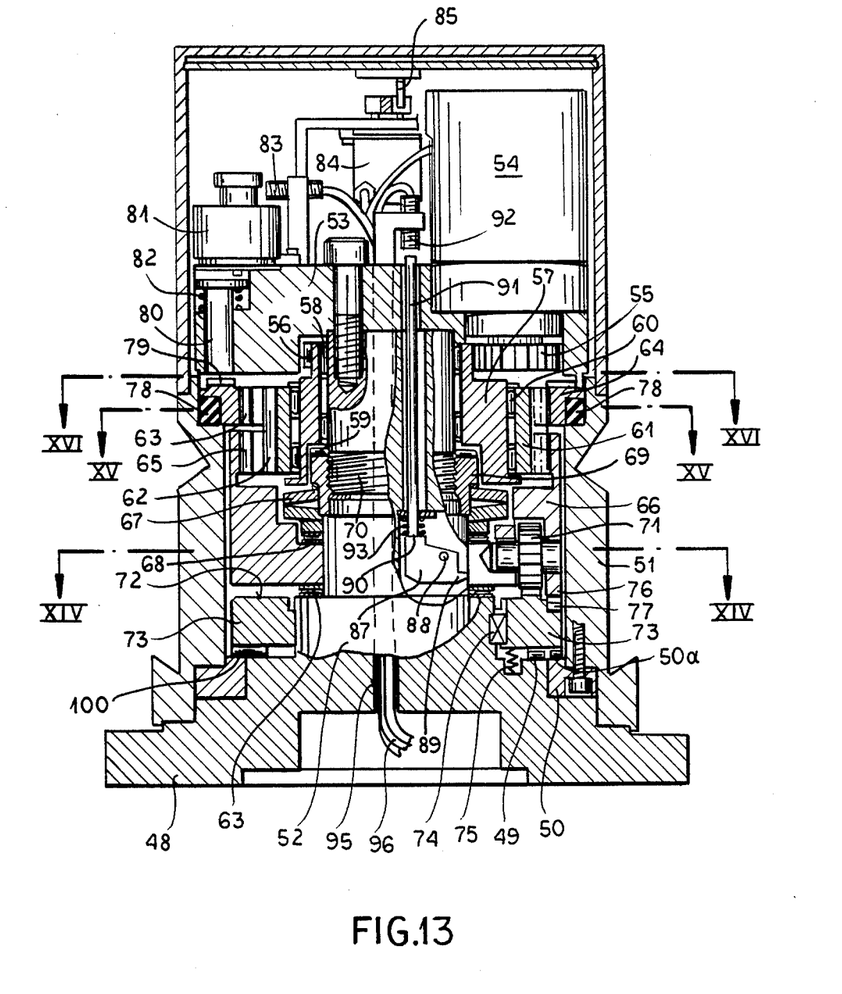
FIG. 13 is an axial section through a tool holder turret of the invention, of the type with a vertical axis.

This is possible, as is known, if the difference between the two toothings is small, for example a single tooth, particularly in the case of the internally tooth planetary gear 45. FIG. 13 shows a turret of the invention in a configuration with a vertical axis.

It comprises a base 48 bearing the fixed front toothing 49; about this is provided the crown gear 50 with toothin 50a rigid with the external body 51 of the turret to which the tool holder plate (not shown) is connected in a known manner.

The base 48 comprises a central pin 52 with a vertical axis to whose upper end a plate 53 bearing the motor 54 is connected.

The motor 54 bears a pinion 55 which engages with the crown gear 56 of a planetary gear holder 57 supported to rotate about the pin 52 with the rollers 58 and the thrust bearing 59.

A planetary gear 61 is eccentrically supported, via the rollers 60, about the planetary gear holder 57, the exteranal toothing 62 of this gear engaging wih the toothing 63 of an internally toothed ring 64 rigid with the body 51 and with the internal toothing 65 of a roller carrier 66 coaxial with the pin 52 and bearing on the base thereof via a thrust bearing 63.

The roller carrier 66 can slide on the pin 52 and is kept pressed against the base of the pin 52 by a pack of cup springs 67 bearing on the roller carrier via a thrust bearing 68 and connected at the opposite end to a ring 69 rigid with the pin 52 via a thread 70.

The roller carrier 66 bears a plurality of rollers with a radial axis 71 bearing against the front cam profile 72 of a locking ring 73 provided with front toothing 100 which can engage with the toothing 49 of the base 48 and with the crown 50.

The ring 73 can slide on the pin 52 and is locked against rotation by a key 74 or the like. A plurality of springs 75 are interposed between the base 48 and the ring 73 and are designed to move the ring 73 away from the crown 50 and the base 48 while maintaining the front cam profile 72 in contact with the rollers 71.

Figures 14, 14A:
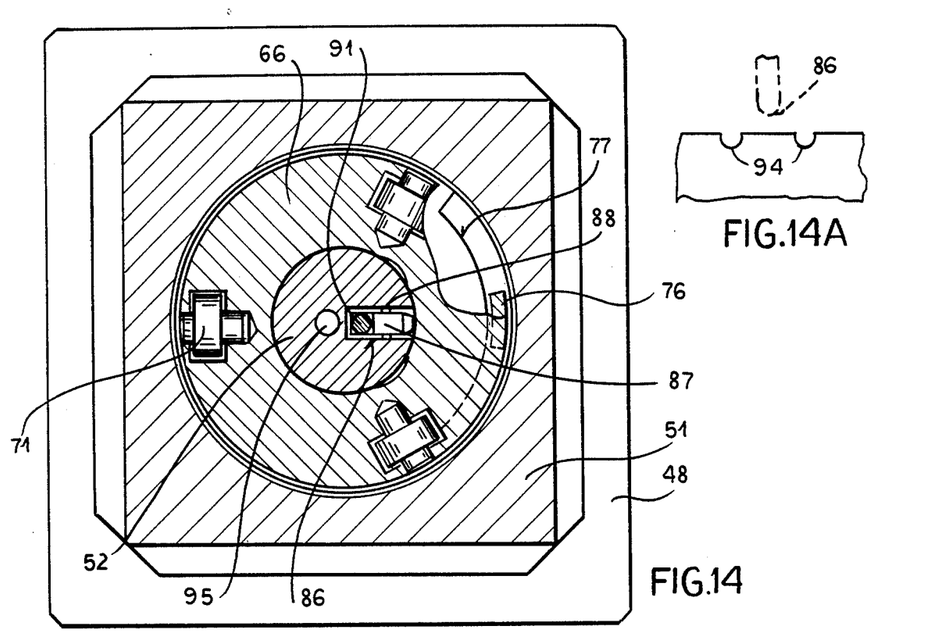
FIG. 14 is a section along the line XIV—XIV of FIG. 13.
FIG. 14a is a detailed of FIG. 14.

A tooth 76 projects from the body 66 and engages in the recess 77 of the ring 73, as shown in FIG. 14.

Figure 15:
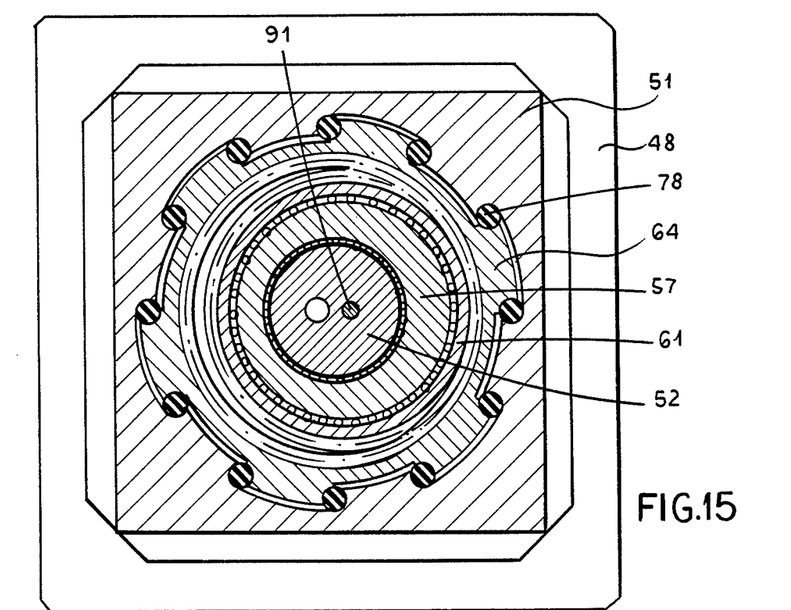
FIG. 15 is a section along the line XV—XV of FIG. 13.
Figure 16:
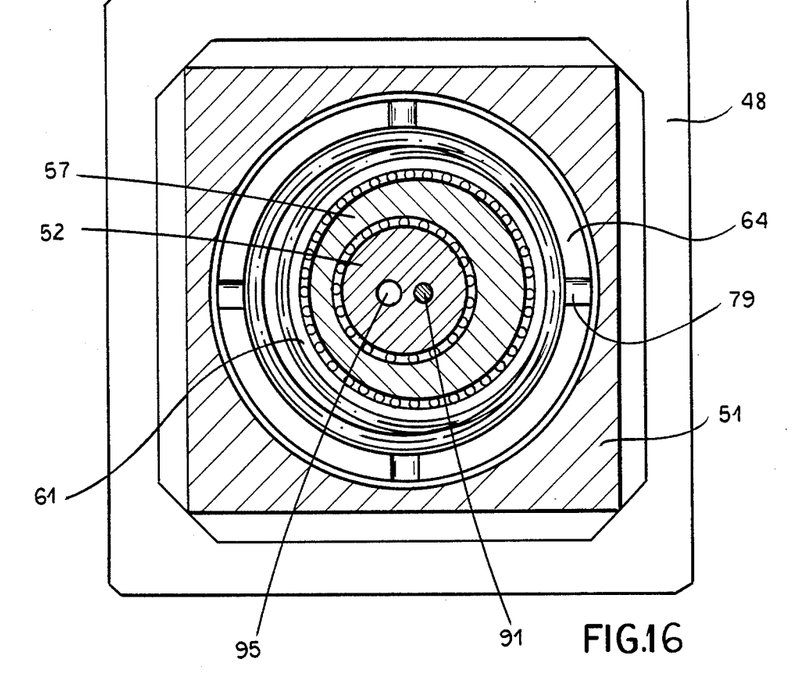
FIG. 16 is a section along the line XVI—XVI of FIG. 13.

The toothed ring 64, as shown in FIG. 15, is connected to the external body 51 via damping joints 78, of rubber or the like, and comprises a plurality of front notches, as shown in FIG. 16, whose number and position correspond to the tools mounted on the turret.

As least one bolt 80 borne by the fixed plate 53 and provided with a relative actuator 81 and opposition spring 82, associated with a proximity sensor 83, is provided opposite the notches 79; the fixed plate 53 also bears an angular position detector 84 detecting the rotation of the external body 51 via the peg 85.

The operation of the turret is completely identical to that of the turret of FIG. 1 described above in detail; the configuation shown makes it possible to achieve a relatively small radial dimension which is particularly important for turrets of the type with a vertical axis.

A notch 86 in which there is located a lever 87 rotating about a pin 88 is advantageously provided within the pin 52; the end 89 of the lever 87 bears against the inner cylindrical surface of the roller carrier 66 and its opposite end 90 bears against a rod 91 extending through the pin 52 up to the vicinity of aproximity sensor 92; a spring 93 keeps the end 89 of the lever in contact with the inner wall of the roller carrier 66.

As shown in FIG. 14, the inner wall of the roller carrier 66 comprises, at the location of the end positions of the angular stroke of the tooth 76 in the recess 77, two concave portions 94; like the concave portions 38 previously described in these positions the level 87 rotates in the clockwise direction in FIG. 13, distancing the rod from the sensor 92, while in the intermediate position in the concave portions the opposite rotation of the lever makes it possible to detect the fact that the rollers have been returned to the plane portion of the cam profile 72, shown above by 39 in FIGS. 9 and 10, thus indicating the closure of the turret and causing the shutdown of the motor 54, as has been described above for the sensor 36 in the turret of FIG. 1.

A hole 95 in the pin 52 enables the electrical supply and control cables 96 to pass outside the turret.

Figure 17:
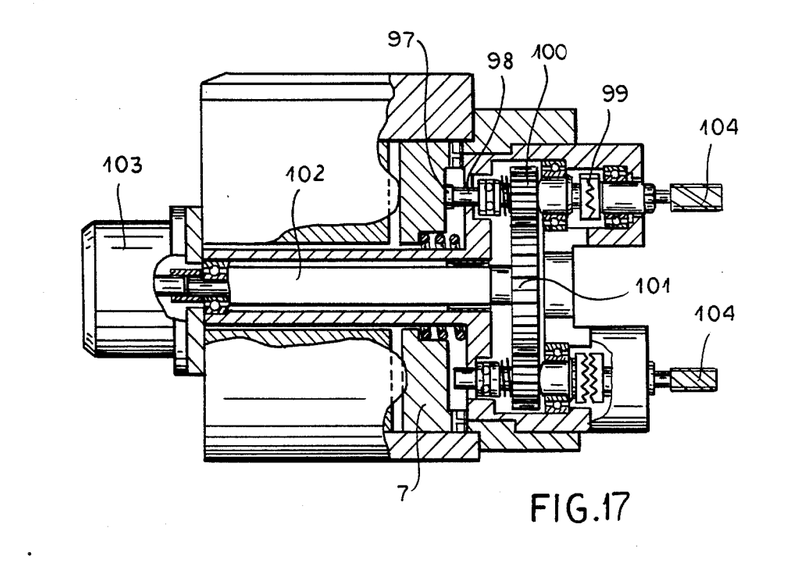
FIG. 17 is a partial section through the turret of the invention provided with tool rotation means with a central motor-driven shaft.
Figure 18:
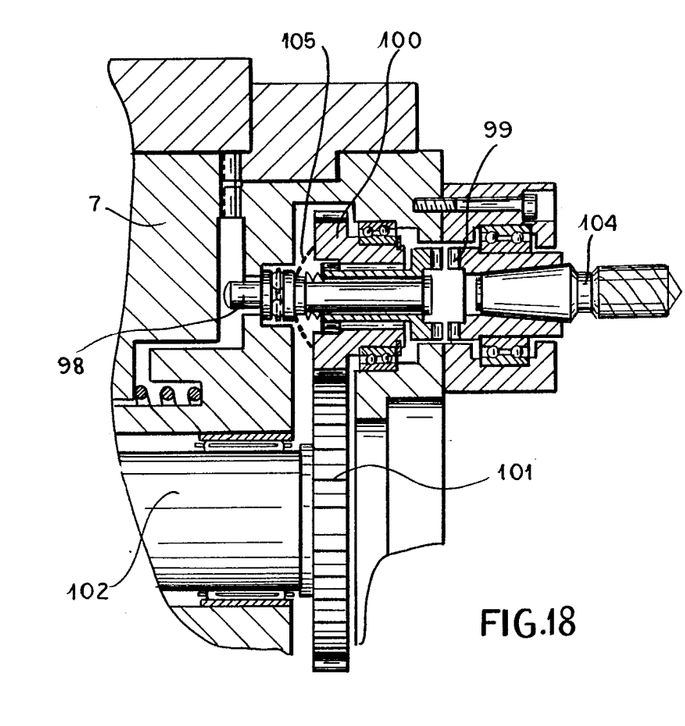
FIG. 18 is an enlarged detail of the tool rotation device of FIG. 17, in a position with the tool inactive.
Figure 19:
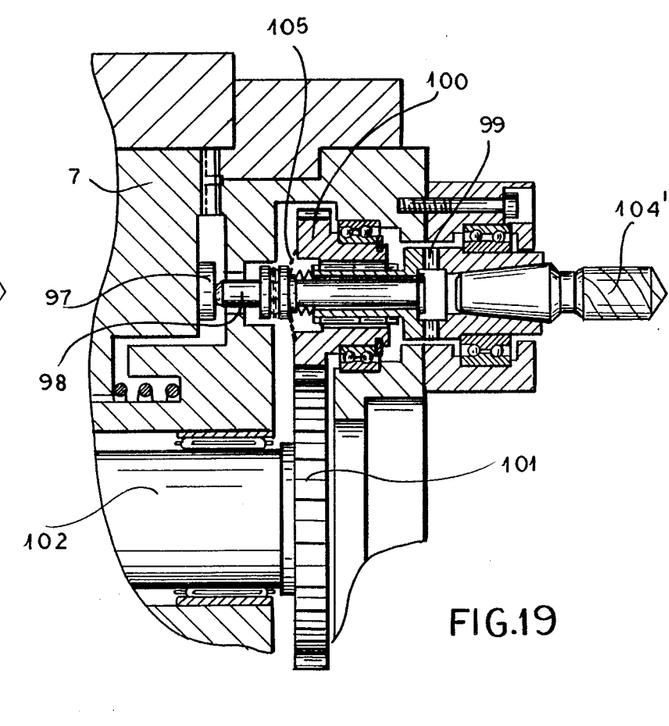
FIG. 19 is an enlarged detail of the tool rotation device of FIG. 17, in the position with the tool activated.

As shown in FIGS. 17, 18 and 19, the ring 7 of the turret, since it is subject only to axial displacement, may be provided, at the tool operating position, with a projection 97; this projection may act on the rear pin 98 of a clutch 99, caused to rotate by pinion 100, within which it is axially slideable, coupled, in turn, with a gear 101 caused to rotate via the central shaft 102 by a motor 103.

In this way, as can been from FIG. 18, when a tool 104 is not in the operating position the pin 98 is held back from the spring 105 and the clutch 99 remains open: this holds the tool 104 stationary as well as any other rotary tool present and mounted in a similar way which is not in the operating position, even if the gear 101 is caused to rotate.

When a tool 104', shown in FIG. 19, is located in the operating position, at which point the projection 97 is provided, the latter causes the forward feed of the pin 98 and the subsequent closure of the clutch 99, thus allowing the tool to be driven in rotation.

This is possible as a result of the fact that the locking ring 7 is distanced in respect of the location of the opening of the crown gears 3, 5, 8 so that the projection 97 does not interfere with the rotation of the turret; in additon, the locking ring 7, since it does not perform a rotary movement, ensures that the tool caused to rotate is the tool in the operating position at the location of which the ring 7 comprises the projection 97.

Figure 20:
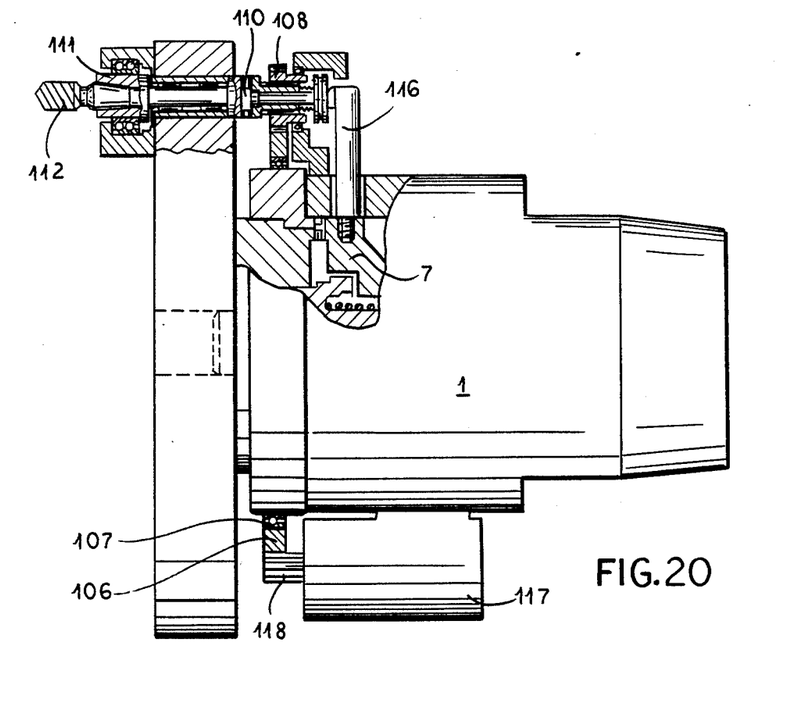
FIG. 20 is a view, partly in section, of a turret of the invention provided with an alternative embodiment of the tool rotation device.
Figure 21:
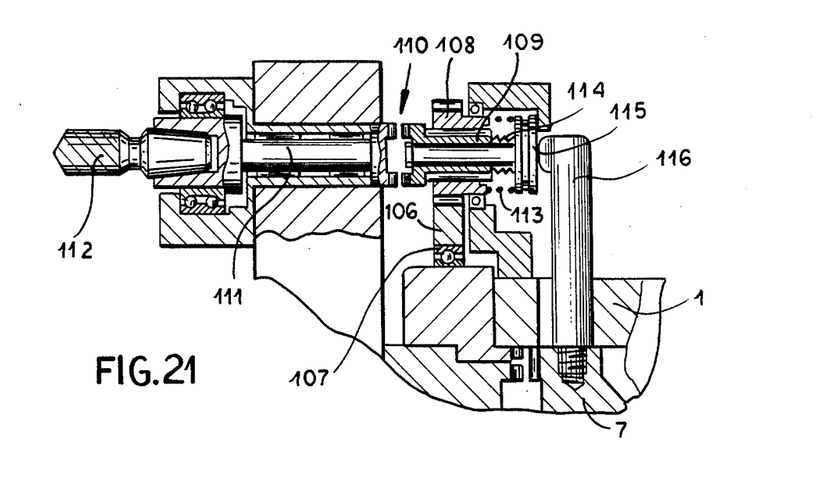
FIG. 21 shows an enlarged detail of the tool rotation device of FIG. 20.

FIGS. 20 and 21 show a further alternative embodiment, comprising a gear 106 disposed on the periphery of the external body 1 of the turret and supported by the bearing 107; the pinions 108 of the motor-driven tools, within which the axially movable portion 109 of a clutch with front toothing 110 is axially slideably, engage with this gear.

The axially fixed portion 111 of the clutch bears the rotary tool 112 at its end.

A spring 113, or like resilient means, keeps the clutch in its normally open position, while the cup springs 114 ensure that there is no play in the closed position of the clutch.

A projection 116, rigid with the locking ring 7 and axially movable therewith, acts against the thrust bearing 15 disposed at the free end of the portion 109.

A motor 117, with associated pinion 118, causes the gear 106 to rotate.

The structure of this alternative embodiment which uses, as above, the axial movement of the ring 7 to actuate the closure of the clutch by means of the use of a gear 106 of greater diameter than the gear 101, makes it possible to mount a large number of motor-driven tools, even when tools placed adjacent to one another are caused to rotate.

Many variants may be introduced without thereby departing from the general scope of the invention.

We claim:

1. A tool holder turret for a lathe comprising:
    a housing having a longitudinal axis and provided with a fixed support member coaxial with said housing;
    a shaft extending longitudinally in said housing and having a respective axis parallel to said longitudinal axis, said shaft having a periphery thereof and formed with two opposite ends;
    a rotary member mounted on one of said ends of said shaft and coaxial therewith;
    a tool holder plate operatively connected with said rotary member and coaxial with said shaft;
    a reversible drive motor spaced from said rotary member in said housing and having a motor shaft rotatable about a motor axis parallel to said longitudinal axis;
a differential epicyclic transmission unit comprising:
a first member driven by said driven motor and coaxial with said longitudinal axis;
a second annular member coaxial with said longitudinal shaft and connected rigidly with said shaft;
a third annular member spaced axially from said second member and rotatable about said longitudinal shaft, said first member meshing with said second and third members;
an axially movable member provided with means for engaging said support member and said rotary member in a preselected angular position of a respective tool of a plurality of tools to be located on said tool holder plate;
means for arresting the rotation of said shaft in said preselected angular position of the respective tool; and cam means for transmitting the rotational movement of said third member of said epicyclic transmission unit to said axially movable member for the axial displacement thereof.

2. The tool holder turret defined in claim 1 wherein said cam means include a plurality of front rollers spaced equidistantly from one another in said third member of said transmission unit, said rollers extending radially to said axis of rotation of said longitudianl shaft and engaging a projection formed on said axially movable member thereby meshing the latter with said support and rotational members upon displacing of said axially movable member toward said rotary member.

3. The tool holder turret defined in claim 2 wherein said projection is formed with a pair of grooves separated by a plane intermediate portion and one of said rollers is located on said intermediate portion to effect in said preselected angular position of the respective tool the engagement between said rotary, support and axially movable members.

4. The tool holder turret defined in claim 3 wherein said third member is formed with a protrusion formed on a periphery of said third member and juxtaposed with first controlling means for detecting the engagement of one of said rollers with the respective groove formed on said projection of said axially movable member and for terminating the rotation of the motor drive.

5. The tool holder turret define*d in claim 1 further comprising means for limiting the rotation of said third member comprising a pin fixed in said support member and extending radially with respect to said longitudianl shaft toward a notch of a limited angular extenstion formed on a periphery of said third member and juxtaposed with said pin.

6. The tool holder turret defined in claim 1 further comprising means for limiting the rotation of said third membe including a tooth projecting axially from said third member toward a corresponding recess formed on said axially movable member and juxtaposed with said tooth.

7. The tool holder turret defined in claim 1 wherein said means for arresting the rotation of said longitudinal shaft include a plurality of notches formed on said shaft and a bolt movable radially with respect to said shaft and engaging a respective notch corresponding to the preselected tool, said bolt being actuated by a respective actuator associated with second controlling means for controlling the insertion of said bolt into the respective notch and for terminating the rotation of said motor upon the engagement of said bolt with the respective notch.

8. The tool holder turret defined in claim 1 wherein said means for arresting the rotation of said longitudinal shaft include a plurality of notches formed on said support member and at least one bolt movable axially and engaging a respective notch corresponding to the preselected tool, said bolt being actuated by a respective actuator associated with second controlling means for controlling the insertion of said bolt into the respective notch and for terminating the rotation of said motor upon the engagement of said bolt with the respective notch.

9. The tool holder turret defined in claim 1 wherein said axially movable member is provided with damping means for attenuating the impact of the stoppage of said third member of said transmission unit, said damping means being provided with resilient cushion buffers extending transversely to said shaft.

10. The tool-turret holder defined in claim 1, further comprising means for transmitting the axial movement of said axially movable member to the respective tool of said plurality of tools in said preselected angular position.

11. The tool holder turret defined in claim 10 wherein said means for transmitting the axial movement of said axially movable member to the respective tool include:
an external motor driving said tools,
a pinion connected with said motor,
at least one clutch interposed between said pinion and said tools, and
coupling means on said axially movable member juxtaposed with said clutch for engaging said axially movable member with said clutch upon said predetermined angular position of the respective tool being reached.

12. The tool-hoder turret defined in claim 1 wherein said said support, rotary and axially movable members are formed with respective means for intermeshing said members in said predetermined angular position of the respective tool.

13. The tool holder turret defined in claim 12 wherein said means for intermeshing is a first front toothin formed on said rotary member and a second front toothing fixed on said support member coaxial with said first front toothin and a third toothing formed on said axially movable member meshing with said first and second toothing in said predetermined angular position of said tool.

14. The tool holder turret defined in claim 1 wherein said longitudinal axis is a vertical longitudinal axis.

15. The tool holder turret defined in claim 1 wherein said first member of said epicyclic transmission is a planetary gear.

* * * * *